(No Model.)
I. BARKER.
WHEEL AND AXLE FOR MINE CARS.
No. 532,017. Patented Jan. 8, 1895.
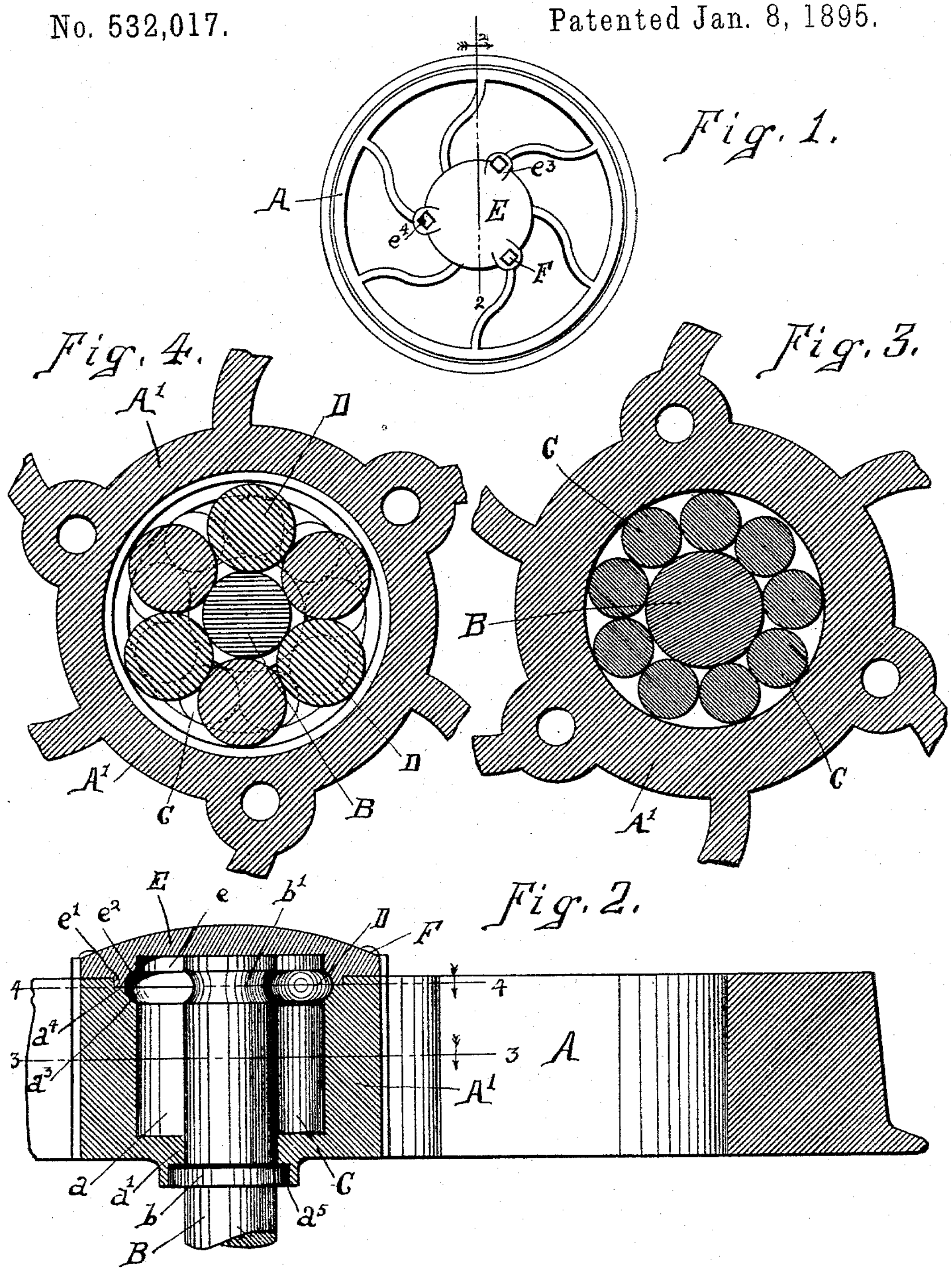
WITNESSES,
Tad A. Bailey.
Will. Q. Olden.
INVENTOR,
Irving Barker
by N. DuBois his Atty.
THE NORRIS PETERS CO., PHOTO-LITHO., WASHINGTON, D. C.

UNITED STATES PATENT OFFICE.

IRVING BARKER, OF SPRINGFIELD, ILLINOIS.

WHEEL AND AXLE FOR MINE-CARS.

SPECIFICATION forming part of Letters Patent No. 532,017, dated January 8, 1895.

Application filed May 14, 1894. Serial No. 511,115. (No model.)

*To all whom it may concern:*

Be it known that I, IRVING BARKER, a citizen of the United States, residing at Springfield, in the county of Sangamon and State of Illinois, have made certain new and useful Improvements in Wheels and Axles for Mine-Cars, of which the following is such a full, clear, and exact description as will enable those skilled in the art to which it pertains to make and use my said invention.

My invention is especially designed to be applied to mine cars or other similar vehicles employed to convey heavy loads in situations where the axles of the car are subject to unusual and severe wear by reason of the dirt and grit in which they work, though it may obviously be applied with advantage to other vehicles.

In practice it is found to be difficult if not impractical to keep the axles properly lubricated for the reason that the users are often negligent in keeping the boxes supplied with oil. Furthermore it is found that the dirt and grit accumulates in the boxes and soon cuts out the boxes and the axles so that the wheels have to be discarded. It is also found that the cost of oil for lubrication is a very considerable item of expense in the operation of such wheels.

The purposes of my invention are to provide a wheel so constructed as to exclude dirt and grit from entering between the wearing parts; to provide an axle of novel and improved construction adapted to be used with said wheel, to provide an improved system of rollers and roulettes adapted to reduce to the minimum the friction between the parts; to provide novel and improved means for connecting the wheel with the axle in such manner as to prevent longitudinal movement and at the same time permit free rotation of the wheel on the axle; and to provide a wheel and axle having hardened bearing surfaces which will not cut and will not require the use of lubricants.

With these ends in view my invention consists of certain novel features of construction and combinations of parts shown in the annexed drawings and hereinafter fully described and specifically claimed.

In the drawings to which reference is hereby made: Figure 1 is a side elevation of the complete car wheel. Fig. 2 is an enlarged vertical section through the wheel and the axle on the line 2 of Fig. 1, one of the rollers and one of the roulettes being removed so as to more clearly illustrate the internal structure of the hub and the cap. Fig. 3 is a partial vertical transverse section through the wheel and axle on the line 3 of Fig. 2. Fig. 4 is a partial vertical transverse section through the wheel and axle on the line 4 of Fig. 2.

Similar letters designate like parts in all the views.

The body A of the wheel is of the usual well known form and need not be particularly described. The hub A′ is integral with the body A. Within the hub is a central bore $a$ of a diameter sufficient to accommodate the axle B and the rollers C surrounding the axle in longitudinal contact with each other. The hub A′ also has an integral internal annulus $a'$. The annulus $a'$ is co-axial with the axle B.

In the outer end of the hub A′ is an internal circumferential groove $a^3$, the cross section of which is approximately a quarter circle.

Adjacent to the groove $a^3$ is an internal circumferential ledge $a^4$ against which the inner flange of the cap abuts when the cap is in place. In the inner end of the hub is a short bore $a^5$ adapted to receive the collar $b$. The collar $b$ which is shrunk on or otherwise secured to the axle B fits in the bore $a^5$. The ledge $a'$ abuts against the collar and the collar serves as a sand band to exclude dirt and grit from the box, and also serves to prevent inward longitudinal movement of the hub on the axle.

The entire box or interior of the hub is chilled or otherwise suitably hardened and the axle is also hardened to prevent abrasion. The axle B has near its outer end a circumferential channel $b'$ adapted to accommodate the enlarged portions of the roulettes D.

The cap E is circular in form and has an internal recess $e$ equal in diameter to the bore $a$. On the inner face of the cap is an integral annular flange $e'$ which fits in the outer end of the hub and abuts against the ledge $a^4$. In the flange is a circumferential chamfer $e^2$ which is in cross section approximately a quarter circle. The chamfer $e^2$ and the groove $a^3$ together form a channel or way adapted to receive the enlarged globular parts of the roulettes D.

On the cap E are lugs $e^3$ pierced by holes $e^4$ which accommodate bolts F which serve to connect the cap with the hub. The rollers C are cylindrical and fit in the bore $a$ and when the wheel is in position on the axle the rollers entirely surround the axle and are in contact with the axle, with each other and with the inner surface of the bore as clearly shown in Fig. 4.

The roulettes D are cylindrical for a part of their length and have an enlarged portion which is bulbous in form. The bulbous portions of the roulettes D fit in the channel formed by the junction of the chamfer $e^2$, and the groove $a^3$, and also fit in the channel $b'$ in the axle B, as clearly shown in Fig. 3.

The cylindrical parts of the roulettes surround that end of the axle which is in the recess in the cap. When the cap is in position on the hub and secured by the bolts F and the rollers and the roulettes are in position as described, it is obvious that the roulettes being in the channels in both the hub and the axle serve to prevent longitudinal movement of the wheel on the axle. They also serve to receive the end thrust of the wheel on the axle and as they turn freely in the channels they also serve to reduce to the minimum the friction resulting from such end thrust. The rollers and roulettes also serve to reduce to the minimum the friction resulting from the rotation of the wheel on the axle.

I am aware that rollers in the hub or box of a wheel have heretofore been used to reduce friction between the wheel and its axle. I therefore do not broadly claim that feature but restrict myself to the novel features of construction herein set forth and specifically claimed.

What I claim as new, and desire to secure by Letters Patent, is—

1. In a wheel and axle for mine cars, the means adapted to prevent longitudinal movement of the wheel on the axle, also adapted to receive the end thrust of the wheel on the axle, to wit:—the roulettes having a cylindrical part and an enlarged bulbous part adapted to turn in a channel, in combination with an axle having a channel adapted to accommodate the bulbous part of said roulettes, the body of the wheel, the hub of the wheel adapted to accommodate rollers, the rollers within said hub, and the cap attachable to said hub, said hub having in its outer end an internal circumferential groove, and said cap having an annular flange provided with a chamfer, said chamfer and internal circumferential groove together forming a channel adapted to accommodate the bulbous part of said roulettes, said cap also having a recess adapted to accommodate the cylindrical part of said roulettes between said axle and said cap, as set forth.

2. In a wheel and axle for mine cars, the combination of the body of the wheel, the hub integral with said body and having a bore adapted to accommodate rollers, the annulus within said hub, the circumferential groove and the ledge in said hub, the cap attachable to said hub and having a chamfered flange abutting against said ledge, the axle fitting in said annulus and having near its outer end a circumferential channel, the collar on the axle against which said annulus abuts, the rollers within bore of the hub and surrounding the axle, and the roulettes surrounding said axle and turning in the channel thereof, as set forth and for the purpose stated.

3. In a wheel for mine cars, the combination of the body of the wheel the hub of the wheel having at its end a circumferential groove and a circumferential ledge adjacent thereto, the rollers, and the roulettes within the hub of the wheel, the cap attachable to said hub and having an internal flange abutting against said ledge, said flange having a circumferential chamfer forming in conjunction with the circumferential groove in the hub a channel adapted to accommodate roulettes, as set forth.

In witness whereof I have hereunto subscribed my name, at Springfield, Illinois, this 2d day of April, A. D. 1894.

IRVING BARKER.

Witnesses:
WM. Q. OLDEN,
TAD BAILEY.